United States Patent [19]

Fourcade

[11] 4,354,179
[45] Oct. 12, 1982

[54] DEVICE CONTROLLED BY INCLINATION OF THE HEAD OF A DRIVER PREVENTING HIS FALLING ASLEEP

[76] Inventor: Jean-Claude Fourcade, 5 square Jasmin, F-78150, Le Chesnay, France

[21] Appl. No.: 137,910

[22] Filed: Apr. 7, 1980

[30] Foreign Application Priority Data

Apr. 5, 1979 [FR] France .................................. 79 08647

[51] Int. Cl.³ ............................................ G08B 21/00
[52] U.S. Cl. ................................................... 340/575
[58] Field of Search .......................................... 390/575

[56] References Cited

U.S. PATENT DOCUMENTS

3,045,225  7/1962  Baldwin .............................. 340/575
3,999,177  12/1976  Greene .................................. 340/279

FOREIGN PATENT DOCUMENTS

908808  8/1972  Canada ................................. 340/120
2376473  7/1978  France .
1547364  6/1979  United Kingdom .

Primary Examiner—Glen R. Swann, III
Attorney, Agent, or Firm—Sandler & Greenblum

[57] ABSTRACT

A housing is shaped and sized to conform to the user's ear in the manner of a hearing aid. Within the housing is a position-responsive switch and a second generator responsive to the switch. An arm extends from the switch exteriorly of the housing to allow easy adjustment of the switch's position relative to the housing. In use, the housing is positioned behind the user's ear and the switch adjusted so that the sound generator is off. Should the user's head nod, the sound generator will be actuated, alerting the user by both bone conducted and atmospherically conducted sound, to prevent his falling asleep.

11 Claims, 2 Drawing Figures

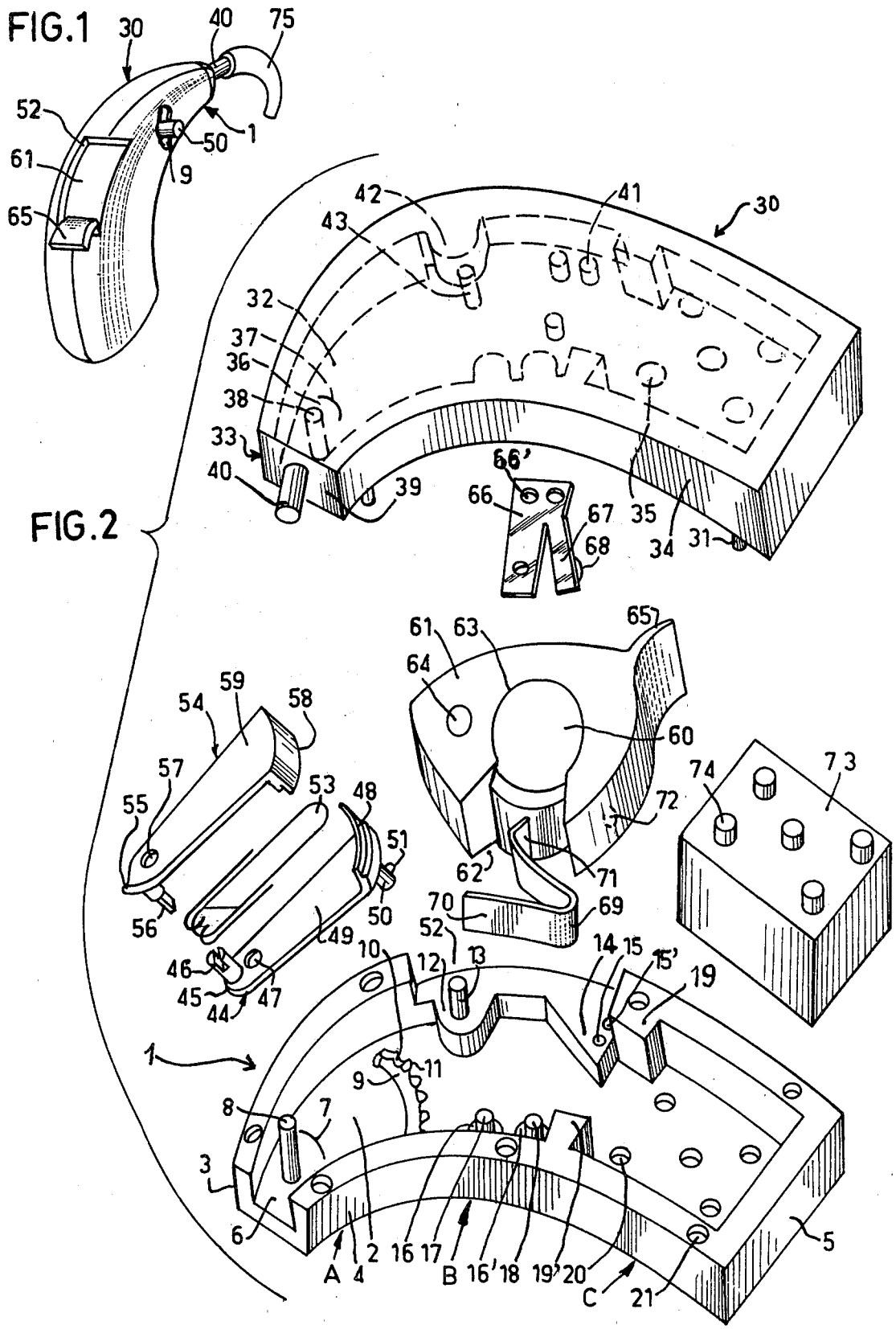

DEVICE CONTROLLED BY INCLINATION OF THE HEAD OF A DRIVER PREVENTING HIS FALLING ASLEEP

BACKGROUND OF THE INVENTION

In French application No. 76 39723 filed Dec. 31, 1976, a device controlled by the inclination of the head of a driver and preventing his falling asleep has been described. The device comprises essentially a detector of the changes of the head positions and an audible warning. The embodiment shows a detector placed on the ear and an alarm positioned in a relatively large box. This device, in use, has proven itself impractical, fragile and of insufficient sensitivity. For example, the shape of the envelope of the detector-interrupter requires precise positioning on the ear and its necessary displacement for establishing (or breaking) the circuit of the alarm renders it troublesome to the user who has little tolerance for it.

SUMMARY OF THE INVENTION

To overcome these and other disadvantages, the inventor has perfected a device of the type mentioned above comprising a head position detector, a warning emitter, and a battery, characterized in that these three miniaturized elements are held in a prosthetic device of the type which is contoured to the ear such that the position of the detector may be adjusted within the very interior of the prosthesis. To do this, the detector comprises a small mercury ampule mounted in a rocker adapted to be pivoted around an interior axis of the prosthesis by means of a finger passing through a slit provided in the end of the prosthesis. The slit is arcuate and at least one of its edges is notched to form a curved rack in which the finger of the rocker or a projection provided for this purpose on the finger penetrates. It is thus possible to place the prosthesis on the ear in a normal position such that it is of little annoyance, and then to cause an adjustment with the finger extending to the exterior, to bring the mercury ampule to a position such that an abnormal inclination of the head causes a sufficient displacement of the mercury in the ampule to close the supply contact of the alarm. This adjustment of the position of the mercury ampule makes it possible for each driver to adapt the device to his morphology and/or his posture.

The mercury ampule thus serves as an automatic breaker or switch in normal usage. It can likewise serve to switch out of service, on the condition that it is properly positioned in the arrangement box, without which the alarm might be unintentionally set off and the battery uselessly wasted.

According to the invention, a second switch or interrupter operated exclusively manually is placed in series with the ampule. Thus, when not in use, the current can be cut, whatever the position of the prosthesis in the arrangement box, and whatever the position of the mercury ampule.

Since the battery must be removeable from the prosthesis for its periodic replacement, it is placed in a support which is maneuverable from the exterior, and this movement is utilized in part to open or close the circuit. The support is pivoted in a passage provided in the thickness of the prosthesis to assume one of three positions. In a first position it is completely embedded and the battery powers the apparatus. In a second semi-embedded position, the battery no longer powers the apparatus but cannot be removed. In a third position the support is almost completely removed from the prosthesis and the battery can be removed or inserted in place. The battery support is generally shaped in the form of a short thick cylinder whose hollow portion is occupied by the battery. This cylinder comprises a large slot or opening over a portion of its periphery placed in the prosthesis and a gripping finger on its external periphery. One of its faces comprises a head adapted to be embedded in the hollows provided in the thickness of the wall of the prosthesis to maintain the support in the embedded or semi-embedded position.

The possible movement of the battery maneuvered by means of the finger of its support makes it possible to rest it or not against two contact springs. One of the springs is positioned laterally and makes contact across the opening of the battery support, and the other spring is attached at the end of the prosthesis and makes contact with the corresponding face of the battery. The lateral spring is in the general form of a "V", one of its arms being fitted in an opening provided in the lateral wall facing the opening of the battery support, the other arm being directed towards this opening with a free end bent in a fashion so as to go through it and to laterally rest on the battery. The spring placed at the end has a general shape of a plate which is half-slotted lengthwise in a manner so as to define two tongues (or fingers) of unequal width. The narrower of the tongues is folded towards the interior with a rounded attachment bent at a right angle to bear against the face of the battery and to make contact.

The prosthesis of the type contoured to the ear is formed of two molded elements comprising complimentary hollows, and which are substantially symmetrical in a fashion so as to define a receptical extending from the narrowest to the widest portion of the prosthesis and constituting a container for the detector of the inclination of the head of the wearer, a container for the battery and its contacts, and a container for the alarm.

The miniaturization of the apparatus has involved a minute study of the prosthesis elements which exhibit numerous original characteristics which can practically only be described by the drawings.

BRIEF DESCRIPTION OF THE DRAWINGS

One embodiment of the invention is illustrated in the annexed drawings in which:

FIG. 1 is an exterior and perspective view of the device ready for use,

FIG. 2 is a schematic and perspective blown-up view of the apparatus assembly (in the alarm position).

DETAILED DESCRIPTION OF THE INVENTION

The device is positioned in a prosthesis of the type whose contour matches the ear. In FIG. 2, the external corners of this prosthesis have been shown in continuous dashed lines for clarity of the drawing, but it is well understood that the exterior corners are rounded, as this may otherwise be seen in FIG. 1.

The prosthesis is formed of two hollowed molded elements 1 and 30 which are complimentary, substantially of the same volume, constituting a container for the apparatus placed therein.

Interiorly the housing is divided essentially into three zones A, B, C to hold the mercury ampule 53, the battery 60 and the alarm 73.

Element 1 comprises walls 2 (called end wall) 3 and 4 (called lateral walls) and 5 (called lower wall). The end 2 has, from left to right in FIG. 2, a planar surface 6 ending in a rounded portion 7 with a spindle 8 at its center. Beyond this rounded portion 7 is a slit 9, slightly curved, whose edge 10 furtherest spaced from the spindle comprises notches 11 defining a curved rack.

Beyond this zone A, is zone B with at this position the wall 3 having a height of approximately one half of elsewhere and with two internal projections or bulges 12 and 14. The projection 12 is rounded and comprises at its center an axle portion 13 extending to the normal level of the wall. The projection 14 is angular with two small depressions 15 and 15'. Opposite this wall 3, the wall 4 is of normal height but is reinforced at 16 until approximately half its height, with an axial portion 17 which extends to the level of the walls. Another projection 16' faces the projection 14, with an axial portion 18. The projections 16 and 16' act as shoulders to define a housing for spring 69 which will be discussed below.

Zone C begins after this projection 14, with a projection 19, 19' facing it. The molding is adapted such that the housing formed by the elements 1 and 30 is parallelipipedic. On the base 2 five depressions 20 are provided for the positioning of the feet 74 of the warning means or alarm 73.

The element 1 comprises small mortises 21 in the upper faces of the walls 3 and 4, and the element 30 has small corresponding cooperating tenons 31.

Element 30 is of a generally similar form to element 1, but symmetrical with respect to their common plane. It comprises walls 32, 33 and 34 with an additional wall 39 provided with a tubular stub 40. The base 32 also comprises a surface 36 ending in a rounded portion 37 whose center is occupied by a spindle 38 (whose height extends to the common level of the elements 1 and 30).

In zone B wall 33 is approximately half as high as elsewhere and comprises a projection 42 (with an spindle portion 43) symmetrical to 12 (and 13) of the element 1. Base 32 comprises small heads 41 for the attachment of the spring 66.

Zone C of element 30 is symmetrical to that of the element 1. It can be bored with small orifices in this zone C.

Other details of manufacture will appear from examination of the drawings. Thus, at zone B one clearly sees that the walls 3 and 33 define between them a passage 52.

It is seen that one places the ampule 53 at A, the battery 60 in B, and the alarm in C in the receptacle.

An ampule of known type is fixed in a rocker comprising two elements 44 and 54 of which one end 45 (and 55) is narrower or rounded with a mortice head and an orifice 47 for the passage of the axial portion 8. The other end 48 of the plate 49 is offset at a right angle in the direction of the other element 54. On the other face of the plate 49 a finger 50 is provided comprising a projection 51. After mounting, this finger passes into the slot 9 and the protrusion 51 lodges itself in notch 11 of the edge 10. Element 54 has the same general form with a rounded end 55 and a tenon head 56 which extends into the mortice 46. The opening or orifice 57 permits the spindle portion 38 to pass in such a manner that the rocker assembly of the ampule can pivot slightly around two half spindles 8, 38 which face one another and constitute a single spindle after assembly. The end 58 of the plate 59 is bent in a right angle towards the other element 44. The ends 48 and 58 bear against one another, and the ampule 53 is held between the two elements 45 and 54, pivotable around the spindles 8 and 38, between the walls of the elements 1 and 30 and blockable in the selected position with the assistance of a finger 50, accessible from the exterior of the apparatus. To assure good protection of the ampule it is embedded in a layer of foam material (not shown in the drawings) upon closure of the rocker.

Battery 60 is mounted in a support 61 of thickness substantially equal to that of the battery and adapted to fit into the passage 52. This support 61 surrounds the battery except at 62 and comprises a curved face 63 for holding the battery. Hole 64 is bored with the thickness of the support for the passage of the half-spindles 13 and 43. Lug 65 is provided opposite this hole.

Still in zone B, is attached interiorly on the base 32, a spring 66, by pressing the pipe 41 into the holes 66'. This spring 66 comprises a tongue 67 which is directed towards the interior. Tongue 67 further comprises an attachment 68 bent at a right angle towards battery 60. Spring 69 is attached along wall 4 on the reinforcement or backing means 16 and 16'. End 70 is placed between the wall 4 and the spindles 17 and 18. This spring has the general shape of a "V" whose bottom end rests against the projection 19' and whose free end 71 is bent towards the battery 60.

Battery 60 is placed in its support 61 and the support is fitted on the spindle 13, 43 of which each of the two portions penetrates into the hole 64 on their respective sides. When one presses on the support 61 and when one makes it pass into the passage 52, the battery 60 makes contact, at its end, with the attachment 68 of spring 66, and then laterally with the end 71 of the spring 69 (across the passage 62). On one of the two faces, the support 61 comprises a protuberance 72 (in a broken line in the figure) which can penetrate into one of the two depressions 15, 15'. When the contact is made between the battery and the two springs 66 and 69, the protuberance 72 is lodged in the depression 15. By pulling on the lug 65, one pivots the support 61 until the moment when the protuberance 72 reaches the depression 15', and at this moment the contact is interrupted, but the battery cannot fall. This maneuver makes it possible to open or close the circuit. When necessary, by continuing to pull on the lug 65, and as a result by continuing to pivot the support 61 around the spindle 13, 43 in a fashion so as to completely disengage the battery, the battery can be replaced.

In the zone C, an alarm or warning device (buzzer) 73 is positioned such that its feet 74 penetrate into the depressions 20 or 35. So as to not complicate the drawings the electrical connections of conventional design have not been shown.

After assembly has been completed, the apparatus is provided with a conventional clip 75 for its good attachment to the ear.

Other embodiments are possible without going beyond the scope of the invention. Preferably the prosthesis has a shape such that it is fitted over the mastoid bone.

The operation of the device can be explained as follows: When the driver inclines his head, the alarm is automatically set off, it emits vibrations and a sound. The vibrations are transmitted by "bone conduction" (because the prosthesis is fitted on the mastoid bone) and the sound is transmitted atmospherically. To improve this atmospheric transmission, one can extend the clip by a canule (hearing tube) ending in a small sphere introduced in the ear hole.

I claim:

1. A device controlled by the inclination of the head of a driver to prevent the driver from falling asleep, said device comprising detector means for detecting the position of the driver's head, warning means operatively connected to said detector means to receive a warning signal therefrom and adapted to emit an audible warning on receiving such signal, and a battery support for supporting a battery serving to power said device, said detector means, warning means and battery support all being housed within a housing and wherein said housing is adapted to match the contour of the ear, said detector means being adapted to pivot relative to said device by movement of finger means extending to the exterior of said housing.

2. The device according to claim 1, wherein the detector means comprises a small mercury ampule mounted in a rocker adapted to be pivoted about a spindle integral with said housing with the aid of said finger means passing through an opening formed in said housing.

3. The device according to claim 2, wherein the opening formed is arcuate and wherein one of the edges of said opening is notched to form a curved rack into which at least part of said finger means penetrates.

4. A device controlled by the inclination of the head of a driver to prevent the driver from falling asleep, said device comprising detector means for detecting the position of the driver's head, warning means operatively connected to said detector means to receive a warning signal therefrom and adapted to emit an audible warning on receiving such signal, and a battery support for supporting a battery serving to power said device; said detector means, warning means and battery support all being housed within a housing and wherein said housing is adapted to match the contour of the ear;
said support being pivotable in a passage extending through a wall of said housing, said support being adapted to assume three positions comprising a first position in which said support is completely embedded in said housing and in which the battery powers the device, a second half-embedded position in which the battery does not power the device but cannot be removed, and a third position in which the support is almost completely exterior to said housing and in which the battery can be extracted or replaced.

5. The device according to claim 4 wherein said support is open over a portion of its periphery to communicate with the interior of said housing, said support further comprising an activating lug on its outer periphery for positioning said support, and wherein said support comprises a pip on one of its faces adapted to embed itself in depressions in said housing to hold the support in an embedded or half-embedded position.

6. A device controlled by the inclination of the head of a driver to prevent the driver from falling asleep, said device comprising detector means for detecting the position of the driver's head, warning means operatively connected to said detector means to receive a warning signal therefrom and adapted to emit an audible warning on receiving such signal, and a battery support for supporting a battery serving to power said device; said detector means, warning means and battery support all being housed within a housing, and wherein said housing is adapted to match the contour of the ear;
said device further comprising two contact springs, a first of said springs being arranged to extend laterally through an open portion in the battery support, the second of said springs being secured to said housing and being positioned to contact one face of the battery.

7. The device according to claim 6 wherein said first spring is generally V-shaped having two branches, one of the branches being adapted to be positioned in a seat formed in the wall of said housing facing a support passage provided for passage of the battery support; the other branch being inwardly directed with its free end being bent to pass into an opening in the battery support to bear laterally against said battery.

8. The device according to claim 6 wherein said second spring has the general shape of a plate which is half split in its longitudinal direction to form two tongues of unequal width, the narrower tongue being inwardly bent and having a rounded attachment bent at right angles towards the battery.

9. A device controlled by the inclination of the head of a driver to prevent the driver from falling asleep, said device comprising detector means for detecting the position of the driver's head, warning means operatively connected to said detector means to receive a warning signal therefrom and adapted to emit an audible warning on receiving such signal, and a battery support for supporting a battery serving to power said device, said detector means, warning means and battery support all being housed within a housing, wherein said housing is adapted to match the contour of the ear, and said detector means is mounted in a rocker adapted to be pivoted about a spindle integral with said housing with the aid of finger means which extend through an opening in said housing;
wherein said housing is formed of two elements, one of the elements comprising a seat for the detector means, said detector seat being an arcuate compartment having at its middle the spindle situated near one end of the detector seat, the opening being formed at the end of the seat opposite to the spindle wherein one of the edges of the opening has rounded teeth forming a rack which cooperates with at least part of said finger means of the detector means so as to secure said rocker in a selected position.

10. The device according to claim 9 further comprising a seat within said housing for the warning means whereby the warning means is positioned to emit said warning such that said warning is transmitted to the driver through bone conduction.

11. A device controlled by the inclination of the head of a driver to prevent the driver from falling asleep, said device comprising detector means for detecting the position of the driver's head, warning means operatively connected to said detector means to receive a warning signal therefrom and adapted to emit an audible warning on receiving such signal, and a battery support for supporting a battery serving to power said device, said detector means, warning means and battery support all being housed within a housing, and wherein said housing is adapted to match the contour of the ear;
said housing comprising a median seat for the battery and its contacts, and wherein said median seat of said housing comprises one lateral wall of greater thickness on the inside with a spindle portion adapted to contact and retain a spring, and wherein said median seat of said housing comprises a second lateral wall having a portion of reduced height so as to allow for the passage of the battery, said portion of reduced height comprising two depressions for positioning said battery support.

* * * * *

UNITED STATES PATENT AND TRADEMARK OFFICE
CERTIFICATE OF CORRECTION

PATENT NO. : 4,354,179

DATED : October 12, 1982

INVENTOR(S) : Jean-Claude FOURCADE

It is certified that error appears in the above-identified patent and that said Letters Patent is hereby corrected as shown below:

Title page
In the identification of references cited,
-- 1,599,039   8/1970   France-- should be inserted.

In the Abstract, line 3, "second" should be --sound--; and line 4, "An arm" should be --A finger--.

Column 1, line 7, --Patent-- should be inserted after "French"; and line 16, --or switch-- should be inserted after "interrupter".

Column 3, line 1, "wall" (second occurrence) should be --walls--.

Column 4, line 2, "45" should be --44--;

line 17, "pipe" should be --pips--; and line 37, "figure" should be --Figure--.

Signed and Sealed this

Twenty-second Day of March 1983

[SEAL]

Attest:

GERALD J. MOSSINGHOFF

Attesting Officer        Commissioner of Patents and Trademarks